(12) United States Patent
Lynn et al.

(10) Patent No.: US 6,883,635 B2
(45) Date of Patent: Apr. 26, 2005

(54) BALL-SCREW ASSEMBLY ISOLATOR

(75) Inventors: Randy R. Lynn, Gladwin, MI (US); Joel Edward Birsching, Vassar, MI (US); David E. King, Freeland, MI (US); Anthony J. Champagne, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/895,821

(22) Filed: Jun. 29, 2001

(65) Prior Publication Data

US 2004/0007417 A1 Jan. 15, 2004

(51) Int. Cl.[7] ............................................... B62D 5/04
(52) U.S. Cl. ................... 180/444; 180/443; 74/388 PS
(58) Field of Search ............................... 180/443, 444; 74/388 PS

(56) References Cited

U.S. PATENT DOCUMENTS

| | | | |
|---|---|---|---|
| 4,660,671 A | | 4/1987 | Behr et al. |
| 4,666,014 A | * | 5/1987 | Carlson et al. ............. 180/444 |
| 4,735,271 A | * | 4/1988 | Shimizu ..................... 180/446 |
| 4,825,972 A | * | 5/1989 | Shimizu ..................... 180/444 |
| 5,590,732 A | * | 1/1997 | Sugino et al. .............. 180/444 |
| 5,988,311 A | * | 11/1999 | Kuribayashi et al. ....... 180/444 |
| 6,041,885 A | | 3/2000 | Watanabe et al. ........... 180/444 |
| 6,053,273 A | * | 4/2000 | Shimizu et al. ............. 180/444 |
| 6,186,268 B1 | | 2/2001 | Onodera et al. ............ 180/444 |
| 6,237,713 B1 | * | 5/2001 | Onodera et al. ............ 180/444 |
| 6,244,125 B1 | * | 6/2001 | Sano ...................... 74/388 PS |
| 6,367,593 B1 | | 4/2002 | Siler et al. |
| 6,422,334 B1 | | 7/2002 | Cole |
| 6,499,369 B1 | | 12/2002 | Piotrowski et al. |
| 6,502,995 B1 | | 1/2003 | Ozsoylu |
| 6,659,219 B2 | * | 12/2003 | Okada et al. ............... 180/444 |

OTHER PUBLICATIONS

EP Search Report dated Jan. 9, 2004 for European Serial No. 02 07 7178.

* cited by examiner

Primary Examiner—Lesley D. Morris
Assistant Examiner—L Lum
(74) Attorney, Agent, or Firm—Michael D. Smith

(57) ABSTRACT

An isolation system for a ball-screw assembly including: a ball-screw; a ball-screw nut wherein the ball-screw is configured to engage the ball-screw nut, the ball-screw nut is enclosed in a ball-screw nut container; and a member disposed between the ball-screw nut and the ball-screw nut container, the member having selected properties.

A method of providing a degree of freedom to a steering mechanism, the method including: selecting a member, the member having selected properties; and interposing the member between a ball-screw nut and a ball-screw nut container.

86 Claims, 7 Drawing Sheets

BALL-SCREW ASSEMBLY ISOLATOR

BACKGROUND

Electrically actuated or electrically assisted steering system provide power assist to a steering assembly by providing a sleeve surrounding and threadingly engaged with a rack such that rotation of the sleeve by a motor imparts force to the rack, thereby assisting the driver in steering the vehicle. However, the force from the motor on the sleeve may result in high friction and excessive wear and tear.

In addition, electrically actuated or electrically assisted steering systems can produce noise that is heard by the driver. In particular, noise is produced in a rack assembly when the rotary mechanism of the motor is converted to linear motion by a ball-screw assembly. When the balls in the bearings and balls in the ball-screw move in the channels of the bearings and ball-screw, noise is created that is heard by the driver. As the vehicle travels on the roadway, impact of the road wheels on the roadway travels from the road wheels into the rack assembly. Bearings and related hardware must be sized such that loads due to such impact may be borne without exceeding exceptable noise levels. Such loading conditions may require component load bearing capability well above that required due to maximum system output.

SUMMARY

An isolation system for a ball-screw assembly including: a ball-screw; a ball-screw nut wherein the ball-screw is configured to engage the ball-screw nut, the ball-screw nut is enclosed in a ball-screw nut container; and a member disposed between the ball-screw nut and the ball-screw nut container, the member having selected properties. A method of providing a degree of freedom to a steering mechanism, the method including: selecting a member, the member having selected properties; and interposing the member between a ball-screw nut and a ball-screw nut container.

DESCRIPTION OF THE DRAWINGS

Referring now the drawings wherein like elements are numbered alike in the several Figures.

DETAILED DESCRIPTION

Figure 1:
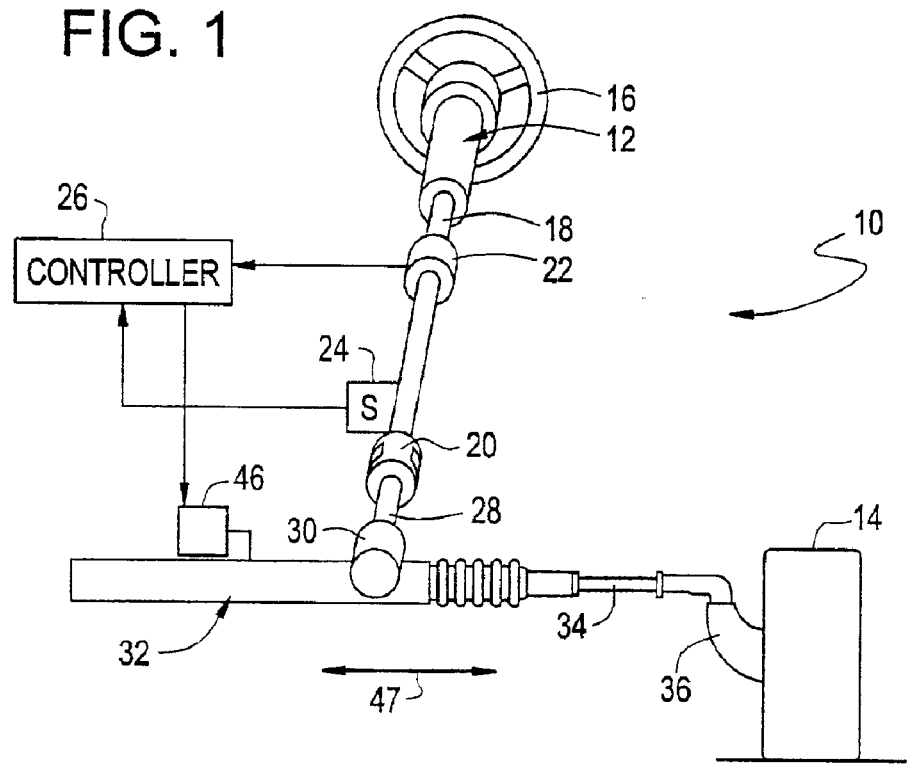
FIG. 1 is an illustration of a steering system for a vehicle.

Referring to FIG. 1, a steering system 10 for use in a vehicle (not shown) is illustrated. Steering system 10 allows the operator of the vehicle to control the direction of the vehicle through the manipulation of a steering column 12. Steering column 12 is mechanically connected to road wheels 14 (only one shown).

Steering column 12 includes an upper steering shaft 18 and a lower steering shaft 28. A hand wheel 16 is disposed at upper steering shaft 18. Hand wheel 16 is positioned so that the operator can apply a rotational force to steering column 12. A torque sensor 22 and a position sensor 24 are located at upper steering column shaft 18 to detect the turning angle of hand wheel 16. Torque sensor 22 and position sensor 24 are in electronic communication with a controller 26. A column universal joint 20 couples upper steering column shaft 18 to lower steering column shaft 28. Lower steering column shaft 28 is secured to column universal joint 20 at one end and a gear housing 30 at the other end. Gear housing 30 includes a pinion gear 38 (shown on FIG. 2), which is in mechanical communication with a rack assembly 32. Rack assembly 32 is coupled to the vehicle's road wheels 14 with steering linkage. Tie rods (only one shown) 34 are secured to rack assembly 32 at one end and knuckles 36 (only one shown) at the other.

Figure 2:
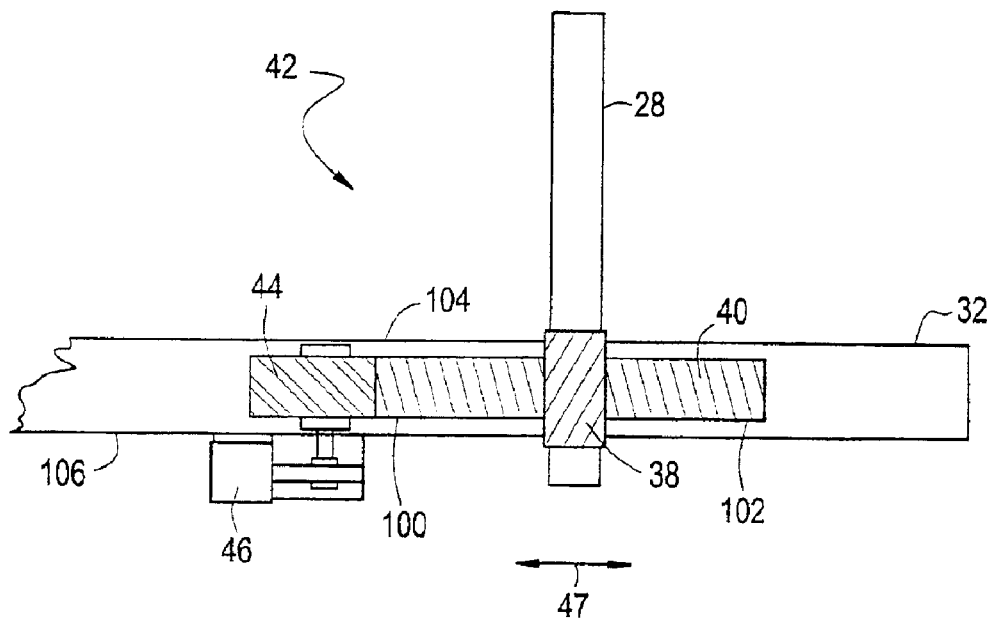
FIG. 2 is an illustration of a portion of the steering system in FIG. 1.

Referring to FIGS. 1 and 2, gear housing 30 includes a pinion gear 38. Pinion gear 38 is positioned to make contact with a matching toothed portion 40 of a rack assembly 32. Pinion gear 38 has teeth that are engaged with teeth of a matching toothed portion 40. Pinion gear 38, in combination with the matching toothed portion 40 of rack assembly 32, form a rack and pinion gear set 42. Matching toothed portion 40 is integrated with a ball-screw 44, which is in mechanical communication with a motor 46. Motor 46 may be located on either a first side 100 or a second side 102 of matching toothed portion 40 of rack assembly 32. In addition, motor 46 may be located either on a top side 104 or a bottom side 106 of rack assembly 32.

When the operator of the vehicle turns hand wheel 16, a rotational force is applied to steering column 12 and pinion gear 38 is accordingly rotated. The movement of pinion gear 38 causes the movement of rack assembly 32 in the direction of arrows 47, which in turn manipulates tie rods 34 (only one shown) and knuckles 36 (only one shown) in order to reposition road wheels 14 (only one shown) of the vehicle. Accordingly, when hand wheel 16 is turned, matching tooth portion 40 and pinion gear 38 convert the rotary motion of hand wheel 16 into the linear motion of rack assembly 32. In order to assist the operator-applied force to steering system 10, motor 46 is energized and provides power assist to the movement of rack assembly 32, through ball-screw 44, thereby aiding in the steering of the vehicle by the vehicle operator.

Figure 3:
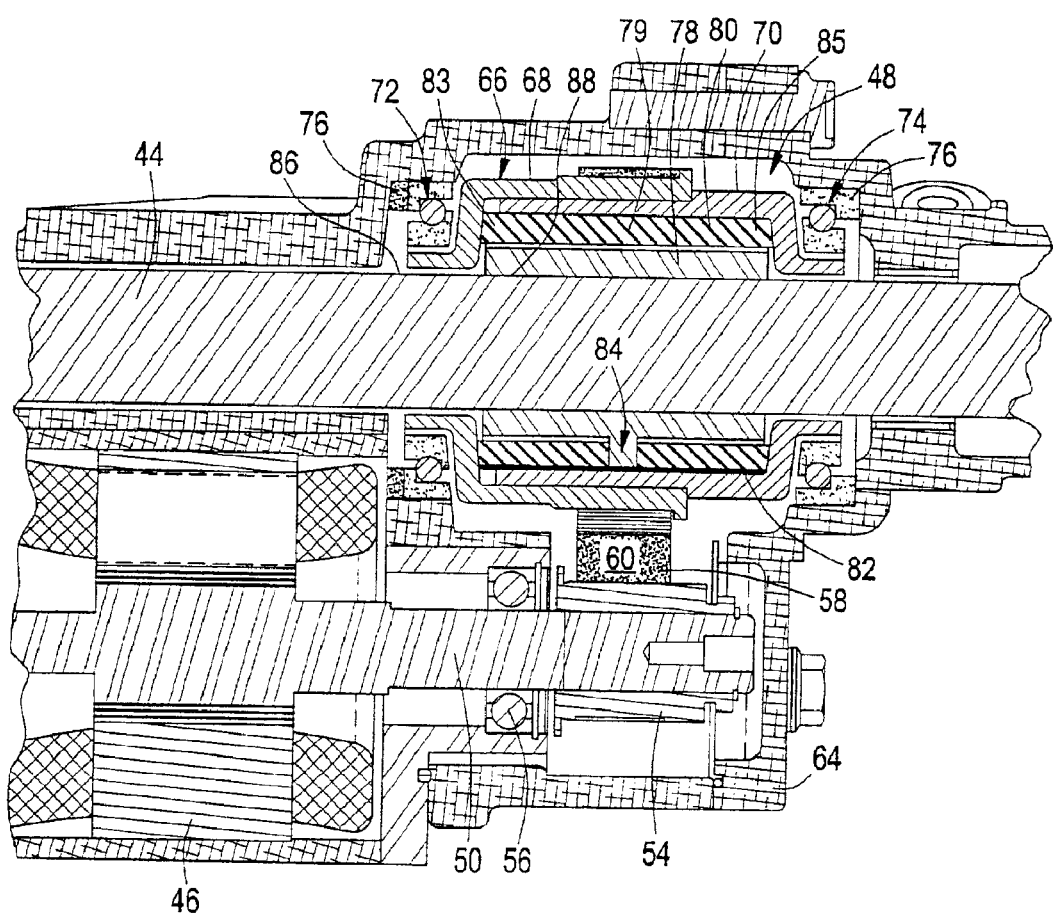
FIG. 3 is a cross-sectional view of a ball-screw assembly isolator.

Referring to FIG. 3, motor 46 is in operable communication with an embodiment of a ball-screw assembly isolator (isolator) 48. The operable communication is maintained via a shaft 50 extending from a motor 46 and a pulley 54 is fixably attached to an opposing end of shaft 50. A bearing 56 supports shaft 50 and allows shaft 50 to rotate when motor 46 is energized. A belt 58, which has an outer surface (not shown) and an inner surface 60, is wrapped around pulley 54 so that inner surface 60 of belt 58 is in contact with pulley 54. Belt 58 also wraps around isolator 48 so that inner surface 60 of belt 58 is in contact with isolator 48. Belt 58, pulley 54, and shaft 50 may be contained in a housing 64.

Isolator 48 includes a ball-screw nut container 66, which includes a first shell 68 and a second shell 70. First shell 68 and second shell 70 may be cylindrical in shape. First shell 68 and second shell 70 are utilized so that ball-screw nut container 66 may be easily assembled. Belt 58 wraps around first shell 68, which functions as a pulley, so that when belt 58 moves, the movement of belt 58 causes first shell 68 to rotate. First shell 68 is force fit against second shell 70 causing second shell 70 to rotate with first shell 68. Moreover, so long as first shell 68 and second shell 70 rotate together as a unit, any means may be used to assemble first shell 68 and second shell 70.

Pulley 54 and ball-screw nut container 66 may be constructed out of any type of material, including a ferrous material, plastic, or a lightweight material such as an aluminum alloy or composites. It is preferred that the aluminum alloy material be used as this allows the overall mass and inertia of steering system 10 to be reduced in order to improve manufacturing costs and performance.

Referring still to FIG. 3, two angular contact bearings 72 and 74 are positioned on the opposing sides of ball-screw nut container 66. Angular contact bearing 72 presses against first shell 68 and angular contact bearing 74 presses against second shell 70. Angular contact bearings 72 and 74 support ball-screw nut container 66 and allow ball-screw nut container 66 to rotate when belt 58 rotates. Spring washers 76, such as wave washers may also be utilized to provide adjustment for angular contact bearings 72 and 74. Alternatively, other types of bearings, e.g., deep groove bearings, could be used instead of angular contact bearings 72 and 74.

Within ball-screw nut container 66 is a ball-screw nut 78 and a member 80. Member 80 may be formed from an elastomeric material or the like, in which varying degrees of stiffness can be obtained through material choice (both with respect to hardness and distinct material composition) and by selective sculpturing of the material. The term member is used throughout this specification to include the singular or the plural as member 80 can be several individual pieces or a single piece. In addition, if several pieces are employed, then each piece can be a different material, and each material can have varying degrees of stiffness or elastomeric properties.

One example of using two different materials includes having a stiffer type of material at a middle section 79 of member 80 and a softer material at a first end 83 and a second end 85 of member 80. By varying the material between middle section 79 and first and second ends 83 and 85, axial, radial, and torsional stiffness of isolator 48 can be modified. Additionally, the pieces of materials may also be interwoven creating varying degrees of stiffness at different sections of member 80. It is important to note that overall stiffness of member 80 is affected by several parameters, as discussed above, that may be selectively adapted to produce the desired stiffness and any desired vibration attenuating characteristics.

Figure 4:
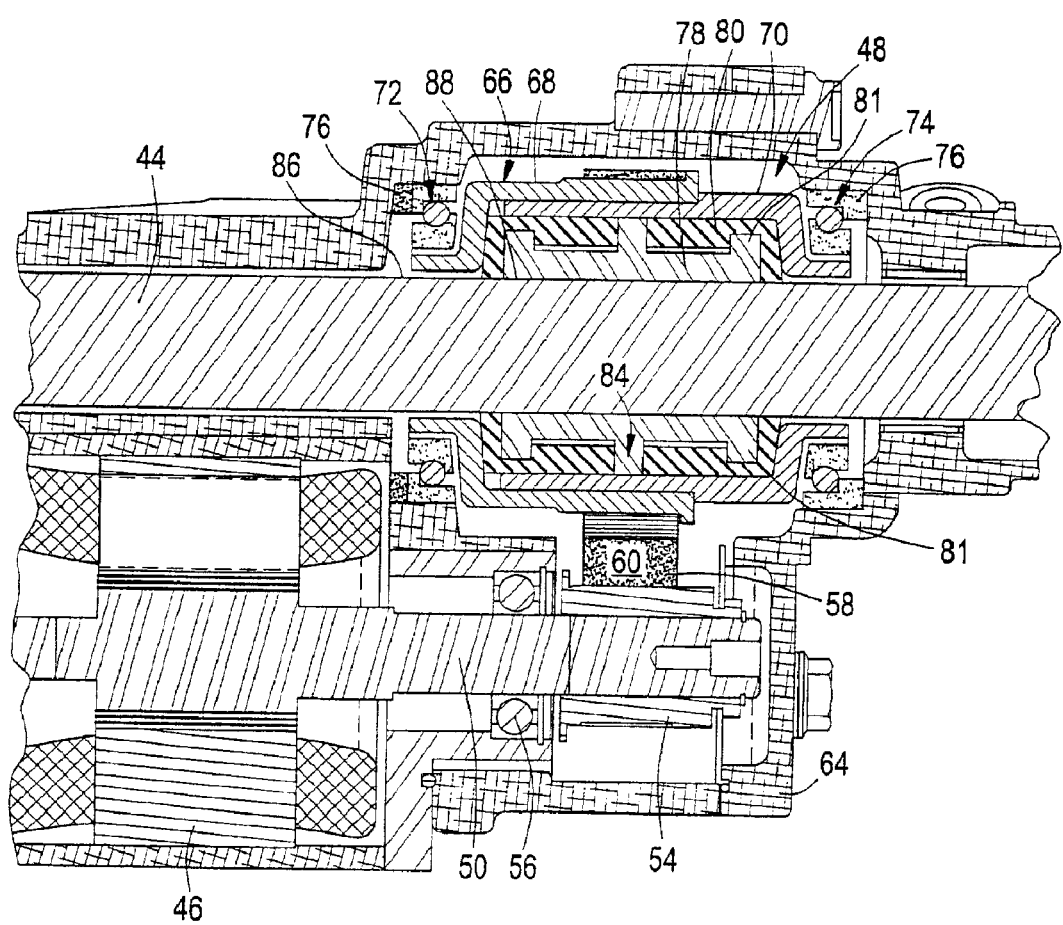
FIG. 4 is an alternative embodiment of a cross-section view of a ball-screw assembly isolator.
Figure 5:
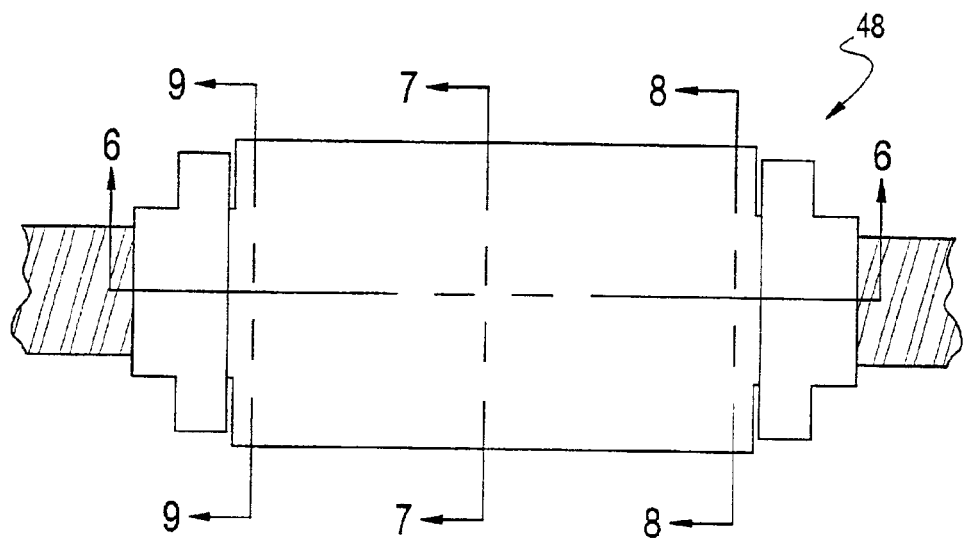
FIG. 5 is an alterative embodiment of a side view of a ball-screw assembly isolator.
Figure 6:
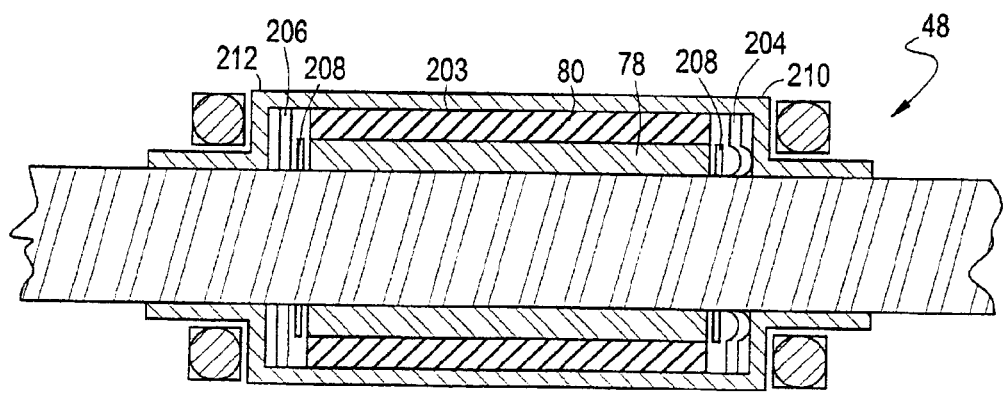
FIG. 6 is a cross-section view of the ball-screw assembly isolator in FIG. 5.
Figure 7:
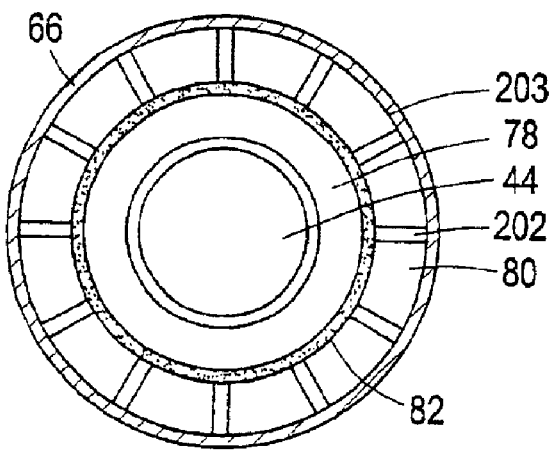
FIG. 7 is a cross-section view of the ball-screw assembly isolator in FIG. 5.
Figure 8:
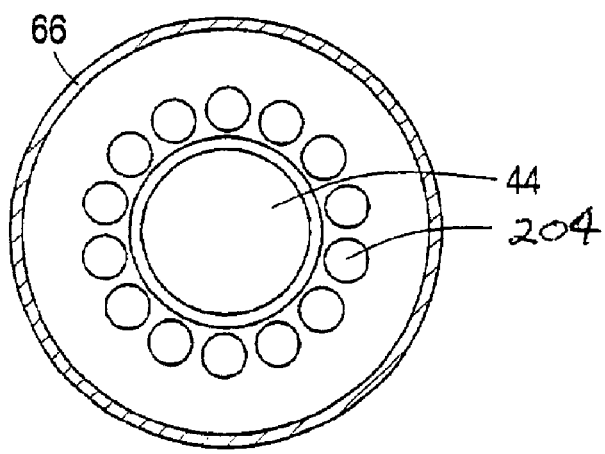
FIG. 8 is a cross-section view of the ball-screw assembly isolator in FIG. 5.
Figure 9:
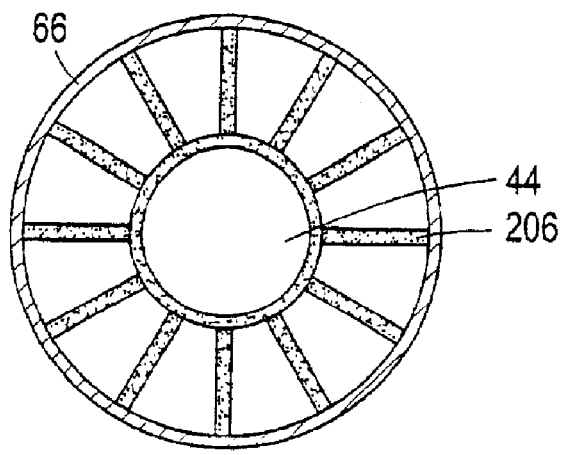
FIG. 9 is a cross-section view of the ball-screw assembly isolator in FIG. 5.

Member 80 is located between ball-screw nut 78 and ball-screw nut container 66. Member 80 may be pressed or may also be secured to second shell 70 with an adhesive 82. In addition, FIG. 4 illustrates an alternative embodiment for securing member 80. Member 80 is captured by an extension 81 of ball-screw nut 78.

Referring again to FIG. 3, ball-screw nut 78 has a flange 84 that may be continuous and contain either slots or notches to allow engagement of member 80. Flange 84 may also include a surface having at least one interruption, cut, formed, or otherwise disposed therein to provide maximum torque to transmit from ball-screw nut container 66 to ball screw nut 78. In addition, flange 84 may be configured to be otherwise circumferentially discontinuous. Ball-screw nut 78 also contains an opening therethrough to receive ball-screw 44. An outer surface 86 of ball-screw 44 engages an inner surface 88 of ball-screw nut 78. Ball-screw nut 78 and ball-screw 44 together may also be referred to as a rotary-to-linear actuator or ball-screw assembly.

Referring to FIGS. 5 through 9, an alternative embodiment of isolator 48 is shown, which illustrates changing the structure of member 80 by cutting out sections of member 80 to create various geometries of member 80. By cutting out sections of member 80, the material of the member can flow into the voids and thus create a different stiffness value for the member. This embodiment demonstrates member 80 with ribbing 202, which are rectangular, cut out sections of member 80. Ribbing 202 may occur at various sections along member 80 and provides for additional torsional compliance of isolator 48. Ribbing 202 may be connected by an outer edge 203 to improve bonding.

Additional axial compliance may also be attained with isolator 48. Bumpers 204, star washers 206, and/or rings 208 may be inserted at ends 210 and 212 of isolator 48. For illustration purposes, bumpers 204 are shown at one end of FIG. 6 and are also reflected in FIG. 8 and star washer 206 are shown at the other end of FIG. 6 and are reflected in FIG. 9. Ring 208 is reflected in FIG. 6. Bumpers 204 can have a range in hardness also, which affects the axial compliance. Rings 208 also assist in reducing friction when isolator 48 rotates. To attain an even higher stiffness or lower friction, rings 208 may be made from a different material.

Figure 10:
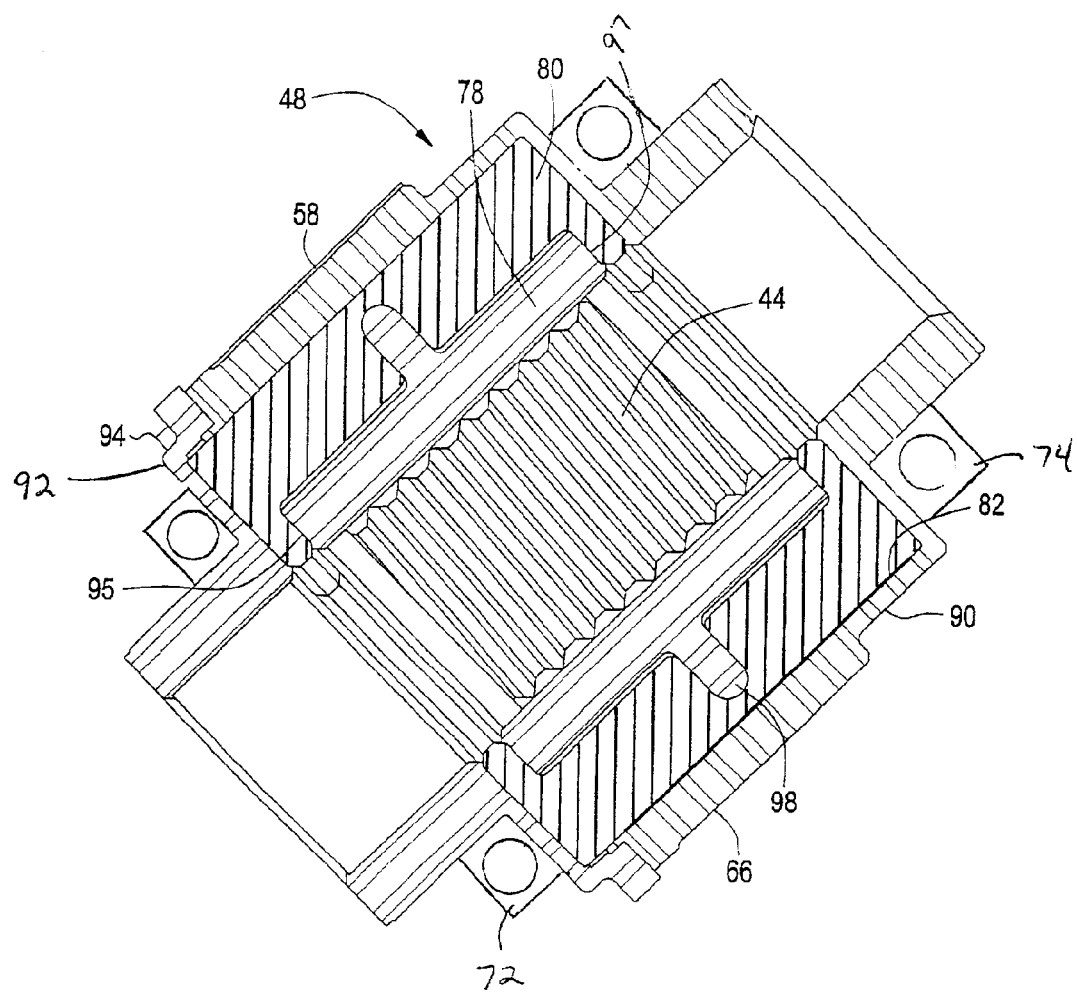
FIG. 10 is an alternative embodiment of a top view of a ball-screw assembly isolator.

Referring to FIG. 10, an alternative embodiment of isolator 48 is shown, which illustrates an alternative ball-screw nut container 66 with a container 90 with a cover 92. Cover 92 is secured to container 90 with one or more fasteners 94, such as screws, bolts, or the like. In this embodiment, belt 58 wraps around container 90. Thus, when belt 58 moves container 90 rotates. In addition, member 80 extends around ball-screw nut 78 to both a first end 95 and a second end 97 of ball-screw nut 78 so that ball-screw nut 78 is encased in member 80. Ball-screw nut 78 may be either completely encased or substantially encased in member 80. As in FIG. 3, member 80 is disposed between ball-screw nut 78 and container 90. Member 80 may be secured to container 90 with adhesive 82. FIG. 4 also illustrates a flange 98 as being continuous around the entire ball-screw nut 78; however, flange 98 may also be discontinuous as in FIG. 3.

Figure 11:
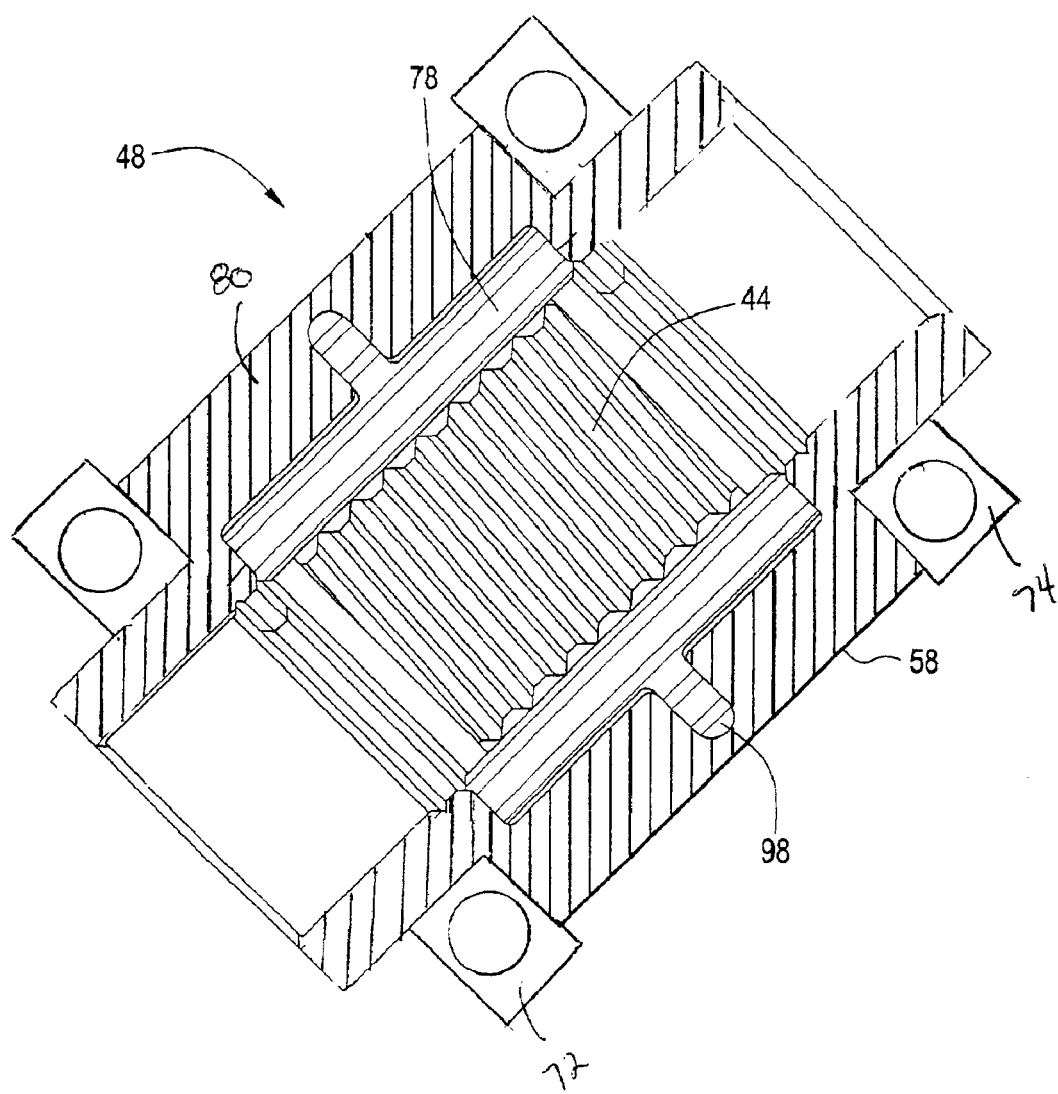
FIG. 11 is an alternative embodiment of a top view of a ball-screw assembly isolator.

Referring to FIG. 11, an alternative embodiment of isolator 48 is shown, which illustrates isolator without ball-screw nut container. Belt 58 wraps directly around member 80. Thus, when belt 58 moves member 80 rotates. Member 80 may be secured to ball-nut 78 with adhesive 82. Referring to FIGS. 1 through 10, the operation of steering system 10 with isolator 48 occurs as follows. When the operator of the vehicle turns hand wheel 16, torque sensor 22 and position sensor 24 detect the steering angle of hand wheel 16. Torque sensor 22 and position sensor 24 send a signal to a controller 26. Controller 26 then provides a signal to motor 46. Motor 46 provides a torque to pulley 54 via shaft 50. The rotational torque of pulley 54 is transferred to belt 58. Alternatively, belt 58 may be replaced by a chain or gear system that provides a rotational torque to ball-screw nut container 66. Accordingly, motor 46, shaft 50, pulley 54, and belt 58 provide a rotary-to-rotary conversion, which is determined by the dimensions of pulley 54 and ball-screw nut container 66 with respect to each other (e.g., gear ratio).

As belt 58 rotates, a torque force is applied to the belt 58, which then rotates the ball-screw nut container 66. The rotational force is converted into a linear force via the rotary-to-linear actuator, which is shown as a ball-screw assembly. The friction between the ball-screw nut container 66 and the ball-screw nut 78 causes the ball-screw nut 78 to rotate. Thus, ball-screw nut container 66 operates as a pulley to rotate ball-screw nut 78. Alternatively, a separate pulley could be fastened or pressed to ball-screw nut container 66.

When ball-screw nut 78 rotates, there is an engagement of ball-screw 44 and ball-screw nut 78 that causes ball-screw 44 to move in a linear direction. The movement of ball-screw 44 correspondingly moves rack assembly 32 in a linear direction, which is shown as the direction of the arrows 47. Of course, the direction of movement of rack assembly 32 corresponds to the rotational direction of pulley 54.

FIG. 11 operates in the same manner as described above, however, there is no ball-screw nut container 66. Thus, as belt 58 rotates, a torque force is applied to the belt 58, which then rotates member 80. The rotational force is converted into a linear force via the rotary-to-linear actuator, which is shown as a ball-screw assembly. The friction between the member 80 and ball-screw nut 78 causes the ball-screw nut 78 to rotate. Bearings 72 and 74 capture member 80. Thus, member 80 operates as a pulley to rotate ball-screw nut 78.

FIGS. 1 and 2 illustrate a power assist steering system that includes a mechanical connection between (rack and pinion) hand wheel 16 and rack assembly 32. Alternatively, and in applications in which a "steer-by-wire system" is employed, there is no direct mechanical connection between hand wheel 16 and rack assembly 32. In this application, the driver's rotational movement of hand wheel 16 (and/or signal from an equivalent driver control device) is input into controller 26 while motor 46 provides the necessary force to manipulate rack assembly 32. In addition, it is also important to note that while isolator 48 has been described as being incorporated into a steering system, isolator 48 can be incorporated into any mechanism that can utilize a ball-screw assembly.

As illustrated by the above-described embodiments, there can be numerous embodiments for isolator 48 by changing the material, the hardness, and the geometry of member 80. By varying the material, the hardness, and the geometry of member 80, isolator 48 creates a range of torsional stiffness, axial stiffness, and radial stiffness at an area where lower steering column 28 and rack assembly 32 are connected. Varying degrees of flexibility can also be attained by adding star washers 206, rings 208, bumpers 204, and the like at the ends of isolator 48.

In order to determine the appropriate stiffness targets for isolator 48, a number of facts are examined to obtain the parameters of the stiffness targets. The source of the vibration is determined and its frequency content is calculated. In addition, the desired natural frequency of isolator 48 is calculated. Typically, the desired natural frequency is about half of the source frequency. The desired vibration isolation stiffness and the allowable movement of the source are evaluated. When determining the allowable movement of the source, both the function and durability of the source should be taken into consideration. In addition, the deflection under load for the desired vibration isolation stiffness is calculated. Stiffness could be increased if needed.

Once the parameters of the stiffness targets have been evaluated, the design of the isolator can occur. A material or a plurality of materials is chosen for member 80. A geometry is also chosen, which includes cutting out sections of member 80. It is preferable to begin with simple geometries, such as that described in FIGS. 7 and 8 to determine whether a simple geometry of member 80 can provide the appropriate stiffness. Once the material and geometry is chosen, a finite element model is constructed and employed to estimate the torsional stiffness, axial stiffness, and radial stiffness. The design process utilizes both an iterative process between finite element modeling and empirical testing. Thus, if a specific geometry chosen does not supply the appropriate stiffness, then another geometry is chosen. In addition, the material or plurality of materials may also be altered to assist in the design.

For example, when designing for torsional stiffness a desired range of displacement of the ball-screw nut or the motor is about 200,000 N m/rad for minimal displacement to about 20 N m/rad for low frequency vibration. The desired range for axial stiffness is about 10,000 N/mm for minimal displacement to about 400 N/mm for small cars and light loads. For radial stiffness, the desired range is about 10,000 N/mm for minimal displacement to about 400 N/mm for small cars and light loads.

In order to more fully understand the method of designing isolator 48, an example of the calculations for the torsional stiffness, axial stiffness, and radial stiffness is provided as a way of illustrating how the stiffnesses are calculated. The calculations take into account simplified assumptions of material mechanics and properties. When actually designing isolator 48, an iterative process between finite element modeling and empirical testing should be utilized.

In order to calculate torsional stiffness (Kt) and torsional deflection of ball-screw nut 78 to pulley 54, assume the source frequency is 100 Hz and above. Thus, the desired natural frequency of the system is 50 Hz (f). If the nut inertia is 0.003 kg·m$^2$/rad (I), the approximate torsional stiffness is Kt=I*(2πf)$^2$=0.003*(2*π*50)$^2$=316 N·m/rad. The deflection is the torque (T) divided by the torsional stiffness or θ=T/Kt. This formula calculates the deflection in radians and thus, radians are then converted to degrees by the formula 2πrad=360 deg; thus, the deflection at 5 N·m is 5 N·m/316 N·m/rad*(360 deg/2πrad)=1 degree.

In order to calculate axial stiffness (Ka) and axial deflection, assume the desired natural frequency is 100 Hz (f) and assume ball-screw 44 and tie rod 34 mass is 6 kg (M). The required axial stiffness is Ka=M*(2πf)$^2$=6* (2*π*100)$^2$=2,370,000 N/m=2370 N/mm. The deflection equals the force divided by the axial stiffness or x=F/Ka; thus, the deflection at 4000 N load is 4000N/2370 N/mm=1.7 mm.

In order to calculate radial stiffness (Kr), assume the amount of radial movement needed is 0.5 mm (x). In addition, assume a sideload force of 1000 N (F). The actual sideload force on ball-screw nut 78 will be a percentage of the total sideload force depending on the position of rack assembly 32. For this example, assume the sideload on the ball-screw nut is 75% of the total sideload force. Since the force equals the radial stiffness multiplied by the deflection or F=(Kr)·x, the radial stiffness is the force divided by the deflection or Kr=F/x=750 N/0.5 mm=1500 N/mm.

As explained above, isolator 48 includes the ball-screw assembly and member 80 surrounding ball-nut 78 and may also include ball-screw nut container 66. Isolator 48 provides degrees of freedom to any type of mechanism that it is incorporated into, which includes a steering mechanism. Isolator 48 can provide degrees of freedom to the steering mechanism by allowing rack assembly 32 and the ball-screw assembly to deflect in any direction, including axially, torsionally, angularly and/or linearly, while at the same time providing an acceptable load carrying capability and without overloading bearings 72 and 74 and the ball-screw assembly. In addition, by controlling the torsional stiffness, axial stiffness, and radial stiffness through the design of member 80 via material choice and by selective sculpturing of the material, the vibration and the deflections of rack assembly 32 and the ball-screw assembly can be controlled to obtain the desired result.

The actual number of degrees of freedom can be calculated using Grubler's equation, which can be found in the book Mabie & Reinholz, "Mechanisms and the Dynamics of Mechanisms and Dynamics of Machinery" ($4^{th}$ ed. 1987) at pages 11–14 and 582–599, which is incorporated by reference herein in its entirety. Grubler's equation provides that the degrees of freedom (d.o.f) of any mechanism must be equal to the number of inputs from the links and joints in the mechanism. The degree of freedom of the entire mechanism may be calculated by:

$$d.o.f.=6*(No.\ of\ Links)+sum\ of\ the\ Constraint\ of\ Joint$$

The "constraint of joint" is a number that is assigned to two links connected by a joint. The number can be obtained from any mechanical kinematics discussion, such as that found in the above referenced text book. If the calculation indicates a negative d.o.f., then the system is overconstrained. If the calculation indicates a positive number, then the system is underconstrained. It is desirable to have a positive number for the degree of freedom.

Isolator 48 provides degrees of freedom at a ball-screw assembly. For instance, a ball-screw assembly has two links, which are a ball-screw nut and a ball-screw. The joint type is a screw. The constraint of joint for those two links and joint is 5. By adding member 80 to ball-screw nut 78, the constraint of joint number increases, thereby increasing the degree of freedom for the system that member 80 and ball-screw nut 78 are incorporated into. Isolator 48 provides additional degrees of freedom to the steering mechanism or whichever mechanism it is incorporated into and eliminates the need for high precision manufacturing and for the use of spherical contact bearings.

Another advantage of isolator 48 is that the ball-screw nut 78 is isolated from the rest of steering system 10 by inserting member 80 between ball-screw nut container 66 and ball-screw nut 78. By isolating ball-screw nut 78, the noise from the balls located in ball-screw 44 does not travel to the driver. Moreover, the noise is isolated and at the same time, the steering remains stiff.

Additionally, as noted hereinabove, when the vehicle travels along the road, road wheels 14 may get jarred by the imperfections of the roadway. When this occurs, road wheels 14 are impacted and jarred and this motion travels to rack assembly 32 and the ball-screw assembly. Isolator 48 dissipates the impact energy. Because the energy is dissipated at isolator 48, the bearing interfaces and the ball-screw assembly do not need to carry the extra load of the impact energy. As a result, such bearing interfaces may be designed and sized to carry the lower resulting loads.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering system for a vehicle, comprising:
   a rack assembly coupled to a road wheel;
   a rotary to linear mechanism coupled to said rack assembly and in operable communication with an electric motor, said rotary to linear mechanism includes a rotary component and a linear component, said electric motor providing an actuating force to said rotary-to-linear mechanism, said actuating force causing said rack assembly to move linearly; and
   an isolation system in operable communication with said rotary-to-linear mechanism and disposed at said rotary-to-linear mechanism,
   wherein said isolation system comprises a member positioned radially outwardly from said rotary component, said member having selected properties.

2. The steering system of claim 1, further comprising a container surrounding said rotary to linear mechanism, said member is positioned so as to contact along an inside surface of said container.

3. The steering system of claim 2, wherein said container comprises a first shell and a second shell.

4. The steering system of claim 2, wherein said container includes a cover.

5. The steering system of claim 2, wherein said container is an aluminum alloy.

6. The steering system of claim 2, wherein said member is secured to said container by an adhesive.

7. The steering system of claim 1, wherein said rotary to linear mechanism is a ball-screw assembly that comprises:
   a ball-screw integrated with said rack assembly; and
   a ball-screw nut wherein said ball-screw is configured to engage said ball-screw nut, said ball-screw nut enclosed in said container.

8. The steering system of claim 7, wherein said member is positioned so as to contact along an inside surface of said container and an outside surface of said ball-screw nut.

9. The steering system of claim 7, wherein said rotary-to-linear mechanism further comprises a pulley fixably secured to a shaft of said motor, said pulley being in mechanical communication with said container.

10. The steering system of claim 9, further comprising a belt in operable communication with said pulley and said container.

11. The steering system of claim 7, wherein said ball-screw nut is flanged.

12. The steering system of claim 7, further comprising a star washer disposed at an end of said ball-screw nut.

13. The steering system of claim 7, further comprising a ring disposed at an end of said ball-screw nut.

14. The steering system of claim 7, further comprising a bumper disposed at an end of said ball-screw nut.

15. The steering system of claim 1, wherein said selected properties are compliant properties.

16. The steering system of claim 15, wherein said cut out section includes a selected pattern to facilitate said member having selected properties.

17. The steering system of claim 1, wherein said member includes a cut out section having a shape.

18. The steering system of claim 1, wherein said member is made from an elastomer material.

19. The steering system of claim 1, wherein said member includes a selected material or materials having a hardness or a plurality of hardness values having selected properties.

20. The steering system of claim 1, wherein said member has a plurality of hardness values.

21. The steering system of claim 1, wherein said member contacts said rotary component.

22. A steering system for a vehicle, comprising:
a hand wheel;
a steering mechanism for transmitting a steering operation of said hand wheel to vary the angular configuration of a road wheel;
a power assist mechanism for providing an assisting force to said steering mechanism, said power assist mechanism being activated in response to said steering operation of said hand wheel, said power assist mechanism includes a rotary component and a linear component; and
an isolation system being operatively coupled to said power assist mechanism,
wherein said isolation system comprises a member positioned radially outwardly from said rotary component, said member having selected properties.

23. The steering system as of claim 22, wherein said rotary component is a ball-screw nut and said linear component is a ball screw, said power assist mechanism further comprises:
an electric motor for providing a rotational force to a shaft;
a pulley fixably secured to said shaft;
a belt in operable communication with said pulley and a ball-screw nut container; and
said ball-screw is configured to engage said ball-screw nut, said ball-screw nut is enclosed in said ball-screw nut container.

24. The steering system of claim 23, wherein said ball-screw nut is flanged.

25. The steering system of claim 23, wherein said ball-screw nut container comprises a first shell and a second shell.

26. The steering system of claim 23, wherein said ball-screw nut container comprises a container and a cover.

27. The steering system of claim 23, wherein said ball-screw nut container is an aluminum alloy.

28. The steering system of claim 23, wherein said member is disposed between said ball-screw nut and said ball-screw nut container.

29. The steering system of claim 22, wherein said selected properties are compliant properties.

30. The steering system of claim 29, wherein said cut out section includes a selected pattern to facilitate said member having selected properties.

31. The steering system of claim 22, wherein said member includes a cut out section having a shape.

32. The steering system of claim 22, wherein said member is made from an elastomer material.

33. The steering system of claim 22, wherein said member includes a selected material or materials having a hardness or a plurality of hardness values having selected properties.

34. The steering system of claim 22, wherein said member has a plurality of hardness values.

35. The steering system of claim 22, wherein said member is secured to said ball-screw nut container by an adhesive.

36. The steering system of claim 22, further comprising a star washer disposed at an end of said ball-screw nut.

37. The steering system of claim 22, further comprising a ring disposed at an end of said ball-screw nut.

38. The steering system of claim 22, further comprising a bumper disposed at an end of said ball-screw nut.

39. The steering system of claim 22, further comprising a container surrounding said rotary to linear mechanism, said member is positioned so as to contact along an inside surface of said container.

40. The steering system of claim 22, wherein said member contacts said rotary component.

41. The steering system of claim 22, wherein said member contacts said ball-screw nut.

42. A steering system for a vehicle, comprising:
a rack assembly coupled to a road wheel;
a ball-screw assembly enclosed in a ball-screw nut container being coupled to said rack assembly and an electric motor, said electric motor providing an actuating force to said ball screw assembly, said actuating force causing said rack assembly to move linearly; and
a member disposed between said ball-screw assembly and said ball-screw nut container, said member is positioned radially outwardly from said ball-screw assembly.

43. The steering system as of claim 42, wherein said actuating force being further accomplished by a pulley fixedly secured to a rotatable shaft of said motor, said pulley being coupled to said ball-screw nut container.

44. The steering system as of claim 43, wherein said pulley is coupled to said ball-screw nut container by a belt.

45. The steering system as of claim 42, further comprising a plurality of sensors for providing signals to a controller, said controller controlling the activation and deactivation of said electric motor.

46. The steering system of claim 42, wherein said ball-screw nut container comprises a first shell and a second shell.

47. The steering system of claim 42, said ball-screw nut container comprises a container and a cover.

48. The steering system of claim 42, wherein said ball-screw nut container is an aluminum alloy.

49. The steering system of claim 42, wherein said member is secured to said ball-screw nut container by an adhesive.

50. The steering system of claim 42, wherein said ball-screw assembly comprises:
a ball-screw; and
a ball-screw nut wherein said ball-screw is configured to engage said ball-screw nut.

51. The steering system of claim 50, wherein said ball-screw nut is flanged.

52. The steering system of claim 42, wherein said member is positioned so as to contact along an inside surface of said ball-screw nut container.

53. An isolation system for a ball-screw assembly comprising:
a ball-screw;
a ball-screw nut wherein said ball-screw is configured to engage said ball-screw nut, said ball-screw nut is enclosed in a ball-screw nut container; and
a member disposed between said ball-screw nut and said ball-screw nut container, said member having selected properties, said member is positioned radially outwardly from said ball-screw nut.

54. The isolation system of claim 53, wherein said selected properties are compliant properties.

55. The isolation system of claim 53, wherein said member includes a cut out section having a shape.

56. The isolation system of claim 54, wherein said cut out section includes a selected pattern to facilitate said member having selected properties.

57. The isolation system of claim 53, wherein said member is made from an elastomer material.

58. The isolation system of claim 53, wherein said member includes a selected material or materials having a hardness or a plurality of hardness values having selected properties.

59. The isolation system of claim 53, wherein said member has a plurality of hardness values.

60. The isolation system of claim 53, further comprising a rack assembly integrated with said ball-screw nut.

61. The isolation system of claim 53, further comprising a pulley fixably secured to a shaft of an electric motor, said pulley being in mechanical communication with said ball-screw nut container.

62. The isolation system of claim 61, further comprising a belt in operable communication with said pulley and said ball-screw nut container.

63. The isolation system of claim 53, wherein said ball-screw nut is flanged.

64. The isolation system of claim 53, wherein said ball-screw nut container comprises a first shell and a second shell.

65. The isolation system of claim 53, wherein said ball-screw nut container comprises a container and a cover.

66. The isolation system of claim 53, wherein said ball-screw nut container is an aluminum alloy.

67. The isolation system of claim 53, wherein said member is secured to said ball-screw nut container by an adhesive.

68. The isolation system of claim 53, further comprising a star washer disposed at an end of said ball-screw nut.

69. The isolation system of claim 53, further comprising a ring disposed at an end said ball-screw nut.

70. The isolation system of claim 53, further comprising a bumper disposed at an end of said ball-screw nut.

71. The isolation system of claim 53, wherein said member is positioned so as to contact along an inside surface of said ball-screw nut container.

72. The isolation system of claim 53, wherein said member contacts said ball-screw nut.

73. A steering system fur a vehicle, comprising:
 a rack assembly coupled to a road wheel;
 a rotary-to-linear mechanism coupled to said rack assembly and in operable communication with an electric motor, said rotary to linear mechanism includes a rotary component and a linear component, said electric motor providing an actuating force to said rotary-to-linear mechanism, said actuating force causing said rack assembly to move linearly;
 a container surrounding said rotary-to-linear mechanism; and
 means for interrupting a vibration at said rotary-to linear mechanism, wherein said means for interrupting comprises a member positioned radially outwardly from said rotary component, said member contacts said container, said member having selected properties.

74. A method of providing a degree of freedom to a steering mechanism, said method comprising:
 selecting a member, said member having selected properties;
 interposing said member between a ball-screw nut and a ball-screw nut container; and
 positioning said member radially outwardly from said ball-screw nut, said member contacts said ball-screw nut container.

75. The method of claim 74, further comprising engaging said ball-screw nut with a ball-screw.

76. The method of claim 74, further comprising integrating said ball-screw with a rack assembly.

77. The method of claim 74, wherein said selecting said member includes selecting a material or materials having a hardness or a plurality hardness values having selected properties.

78. The method of claim 74, wherein said selecting said member includes selecting an elastomeric material.

79. The method of claim 74, further comprising removing a material from said member in a selected pattern to facilitate said member having selected properties.

80. The method of claim 74, further comprising cutting out a section of said member, said section having a shape.

81. The method of claim 74, further comprising supporting said ball screw assembly by disposing a star washer at an end of said ball-screw nut.

82. The method of claim 74, further comprising supporting said ball screw assembly by disposing a bumper at an end of said ball-screw nut.

83. The method of claim 74, further comprising supporting said ball screw assembly by disposing a ring at an end of said ball-screw nut.

84. The method of claim 74, further comprising securing said member to said ball-screw nut.

85. A ball-screw nut isolated by a member in contact therewith said member having selected degrees of freedom properties, said member positioned radially outwardly from said ball-screw nut and in contact with said ball-screw nut.

86. A ball-screw nut isolated by a member in contact therewith said member having selected vibration dampening properties, said member positioned radially outwardly from said ball-screw nut and in contact with said ball-screw nut.

* * * * *